Sept. 20, 1949. I. LUBBOCK ET AL Re. 23,149

COMBUSTION BURNER

Original Filed June 30, 1941 2 Sheets-Sheet 1

Inventors: Isaac Lubbock
Frederick James Battershill

By their Attorney: B. Graham

INVENTORS
Isaac Lubbock
Frederick James Battershill
By
Stevens, Davis and Miller
ATTORNEYS Reissued Sept. 20, 1949 Re. 23,149

UNITED STATES PATENT OFFICE 23,149

COMBUSTION BURNER

Isaac Lubbock and Frederick James Battershill, Great Saint Helens, London, England, assignors, by mesne assignments, to Power Jets (Research & Development) Limited, London, England, a company of Great Britain Original No. 2,398,654, dated April 16, 1946, Serial No. 400,548, June 30, 1941. Application for reissue April 9, 1947, Serial No. 740,298. In Great Britain January 24, 1940

12 Claims. (Cl. 60—14)

This invention relates to an improved apparatus for the continuous generation of hot gases by reaction between air and liquid or pulverulent combustible material. The object of the invention is to provide a more effective means whereby large quantities of the combustible material can be burnt in a zone of comparatively small volume under continuous conditions such as may be required for combustion turbines where the air stream is moving at high speed. Thus the invention has in view rates of combustion which may exceed about one hundred pounds of say, fuel oil per hour per cubic foot of combustion space.

In accordance with the invention the combustible material, in liquid or pulverulent form, is sprayed into a chamber or flame tube, and in the course of passage therethrough to an offtake for the gaseous combustion products it first encounters or is enveloped in or drawn into a swirling flow of primary air which provides a temporarily reversed flow upstream, i. e., in the opposite direction to the general flow of the gases in the flame tube, this flow being again reversed after a relatively short flow path, so as to travel downstream. This phase of the combustion may be described as pre-oxidation or primary combustion utilizing a comparatively small amount of air and is followed by the introduction of a relatively large volume of secondary air with consequent secondary combustion. Substantially all the combustion occurs in these primary and secondary combustion zones.

Additional air, termed herein tertiary, is admitted as a diluent to intermix with the combustion products after they have passed from the secondary combustion zone. This additional air may be introduced in such manner that it will be entrained substantially into the center core of the stream of combustion products where the temperature is usually highest. In order to secure this result, this air may be admitted through tubes spaced around the circumference of the chamber and radially disposed with their outlets close to the center of the chamber.

In the preferred arrangement, the air required for the primary and secondary supplies and for the subsequent dilution is admitted under pressure into a space between the combustion chamber and an outer co-axial cylinder or duct. However, individual air boxes may be provided if desired in order to supply each section.

It has been ascertained that by the process of the invention, involving a progressive form of combustion through intermediate stages of pre-oxidation, the issuing gases are devoid of unburnt or partially burnt substances and that they have the characteristic sweet odour associated with hydroxylation.

Figure 1:
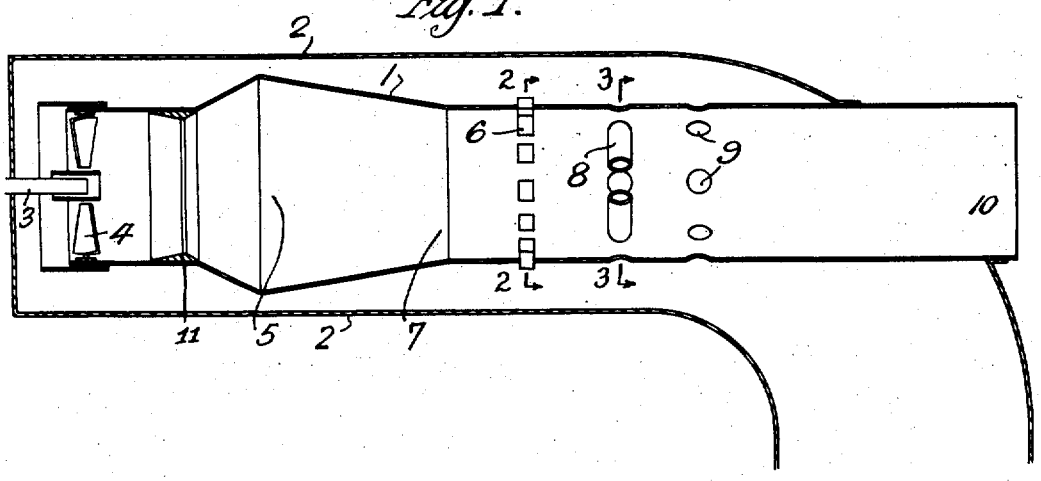
Figure 2:
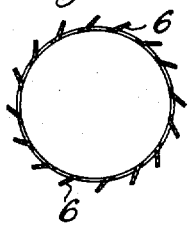
Figure 3:
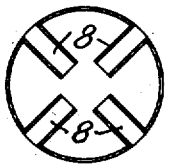
Figure 4:
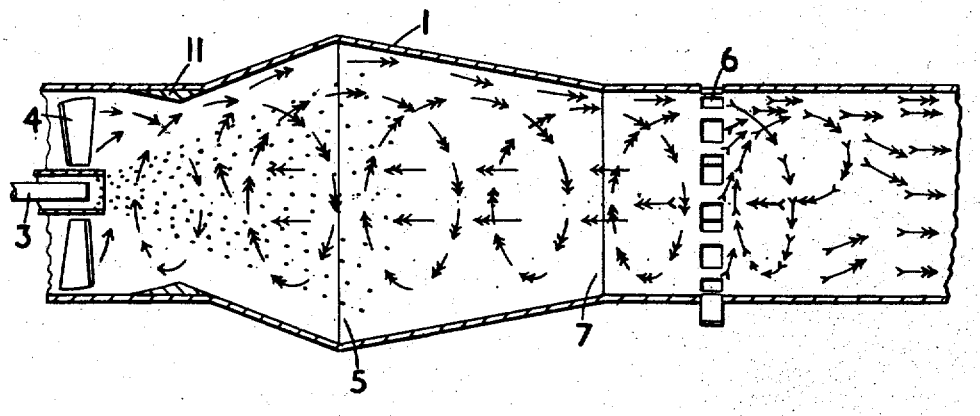

The accompanying drawing shows diagrammatically the preferred embodiment of the invention, Figure 1 being a longitudinal sectional elevation of the apparatus, Figure 2 a section on the line 2—2 of Figure 1, Figure 3 a section on the line 3—3 of Figure 1, and Figure 4 is a partial longitudinal sectional elevation of the apparatus illustrating by arrows the paths of movement of the several gases involved in the combustion.

Referring to the drawing, 1 indicates the combustion chamber casing or flame tube and 2 the cylindrical casing of an air supply duct in which the casing 1 is co-axially mounted. Combustible material in liquid or pulverulent form is introduced into the chamber through the atomizer 3. The primary air, taken under pressure from the air supply duct, is admitted into the chamber through a swirler 4 while secondary air is admitted through the swirler 6.

The primary reaction (pre-combustion) between the combustible material and the primary air occurs in the enlarged zone indicated at 5. A restriction 11 may be provided between the enlarged zone 5 and fuel atomizer 3 as shown.

In Figure 4, the flow of fuel, air, and gases of combustion is indicated approximately. The dotted lines represent fuel issuing from the atomizer 3, the single plain arrows show the path of the primary air, and the double plain arrow heads show the path of the gases of combustion. Secondary air is denoted by feathered single arrows and the gases of combustion produced by the combustion of this secondary air are denoted by feathered double arrows. It will be understood that as the air moves along the flame tube 1 it is gradually converted by combustion with the fuel into gaseous products of combustion.

Upon issuing from the primary swirler 4 the air flows in the vortex path indicated by the single plain arrows and as shown by the double arrows this air is soon converted into a vortex of gaseous products of combustion by being burnt with the fuel. Due to the pressure distribution in the tube 1 created by the air admission arrangements, the central part of this vortex of gaseous products of combustion moves upstream as shown, i. e., from right to left in the drawing, and thus a flow of hot gases of combustion is induced towards the atomizer 3 so as to insure flame stabilization. After the combustion gases in this central part have moved upstream for some distance they become reversed and are drawn into the general direction of flow moving downstream towards the secondary air openings 6. The fuel issuing from the atomizer 3 thus encounters or is enveloped in the vortex of primary air and is thereby burnt.

The swirler 6 induces a similar vortex on the secondary air passing therethrough into the tube 1 as shown by the feathered single arrows and this secondary air is soon burnt to form the final gaseous products of combustion indicated by the feathered double arrows. The secondary vortex combines with and augments the vortex induced in the swirling primary air, the central part of the secondary vortex also moving upstream to assist in flame stabilization.

The ring of ports 6 through which the secondary air is introduced is disposed at a substantial distance from that end of the combustion chamber where the combustible material is sprayed in. The axial position of this ring of admission ports for the secondary air requires fairly close determination having regard to the various conditions obtaining, in order to secure the most satisfactory operation.

For example, if these admission ports are too close to the burner, there will be an insufficient space available to effect the preliminary decomposition of the combustible material before it reaches the burning zone proper which extends further downstream, and the flame will be chilled. It has been ascertained from experiments that the distance of the ring of ports from the sprayer or atomizer should be somewhere not exceeding about twice the greatest diameter of the chamber.

The stream of combustion products from the combustion zones passing forwards through the chamber, is diluted by entraining into its core additional (tertiary) air admitted through the radially disposed tubes 8. Further diluting air is admitted through the holes 9, after which the gases pass to the outlet 10.

What we claim is:

1. Apparatus for heat energizing by continuous combustion a fast moving air stream, comprising a duct for said air stream, a flame tube which is at least partly enclosed by said duct and has an outlet for the gases of combustion, means for projecting a stream of fuel into a region of said tube remote from its outlet, first means defining an entry between said duct and flame tube to afford entry to said region of fuel projection of a primary part only of said air stream effective to initiate combustion of said fuel, means producing swirl in said primary air resulting in a flow having a component of motion upstream in the direction opposite to the general direction of flow in the tube whereby said primary combustion can take place with stability notwithstanding an overall fast moving flow of the air through the tube, second entry defining means located between said first air entry defining means and said outlet and dimensioned to afford entry from said duct to said tube of a secondary part of said air stream effective to complete the combustion of said fuel, said second air entry defining means being so disposed that the entry afforded thereby has its point nearest to said first air entry defining means at a substantial distance therefrom, not exceeding about twice the maximum diameter of the part of the tube between said entries, such that substantial completion of the combustion of said fuel is effected without destroying the stability of primary combustion.

2. Apparatus according to claim 1 in which the flame tube includes third entry defining means located downstream of the second entry defining means, the entry defined by said third defining means functioning to admit into the flame tube a still further part of the air stream in said duct, said further part constituting tertiary air serving as a diluent; the primary, secondary and tertiary air together constituting substantially the whole of said air stream.

3. Apparatus according to claim 1 in which the cross sectional area of the entry defined by the first entry defining means is less than the cross sectional area of the entry defined by said second entry defining means whereby a smaller part of the air stream is admitted to the flame tube as primary air than is admitted as secondary air.

4. Apparatus according to claim 1 wherein the fuel stream projecting means includes a nozzle located coaxially with the flame tube for downstream injection and in approximately the same axial position along the flame tube as the primary air entry defining means.

5. Apparatus according to claim 1 in which the second entry defining means is comprised of a plurality of separate apertures in the flame tube arranged in circumferential series.

6. Apparatus according to claim 1 wherein the second entry defining means includes means for swirling said air to form a vortex which combines with and reinforces the vortex induced in the primary air.

7. Apparatus for heat energizing by continuous combustion a fast moving air stream, comprising a duct for said air stream, a flame tube which is at least partly enclosed by said duct and has an outlet for the gases of combustion, means for projecting a stream of atomized liquid fuel downstream of the general direction of gaseous flow in said tube into the region of said tube remote from its outlet, first means defining an entry between said duct and flame tube to afford entry to said region of fuel projection of a primary part only of said air stream effective to initiate combustion of said fuel, means to produce swirl in said primary air resulting in a vortex flow revolving around the axis of said tube and having a core of reversed flow moving upstream in the direction opposite to the general direction of flow in the tube and extending toward but downstream of the burner nozzle whereby said primary combustion can take place with stability notwithstanding an overall fast moving flow of the air through the tube, second entry defining means located between said primary air entry defining means and said outlet and dimensioned to afford entry from said duct to said tube of a secondary part of said air stream effective to complete the combustion of said fuel, said secondary air entry defining means being so disposed that the entry afforded thereby has its point nearest to said primary air entry defining means at a substantial distance therefrom, not exceeding about twice the maximum diameter of the part of the tube between said entries, such that substantial completion of the combustion of said fuel is effected without destroying said stability of primary combustion.

8. Apparatus according to claim 7 in which the flame tube includes third entry defining means located downstream of the second entry defining means, the entry defined by said third defining means functioning to admit into the flame tube a still further part of said air stream in said duct, said part constituting tertiary air serving as a diluent; the primary, secondary and tertiary air together constituting substantially the whole of said air stream.

9. Apparatus according to claim 7 in which the cross sectional area of the entry defined by the first entry defining means is less than the cross sectional area of the entry defined by the second entry defining means whereby a smaller part of the air stream is admitted to the flame tube as primary air than is admitted as secondary air.

10. Apparatus according to claim 7 wherein the fuel stream projecting means includes a nozzle located coaxially with the flame tube and in approximately the same axial position along the flame tube as the primary air entry defining means.

11. Apparatus according to claim 7 in which the further entry defining means is comprised of a plurality of separate apertures in the flame tube arranged in circumferential series.

12. Apparatus according to claim 7 wherein the second entry defining means includes means for swirling said air to form a vortex which combines with and reinforces the vortex induced in the primary air.

ISAAC LUBBOCK.
FREDERICK JAMES BATTERSHILL.

REFERENCES CITED

The following references are of record in the file of this patent:

UNITED STATES PATENTS

| Number | Name | Date |
|---|---|---|
| 940,813 | Koch | Nov. 23, 1909 |
| 1,163,650 | Fogler | Dec. 14, 1915 |
| 2,404,335 | Whittle | July 16, 1946 |

FOREIGN PATENTS

| Number | Country | Date |
|---|---|---|
| 463,942 | France | Dec. 30, 1913 |
| 691,430 | Germany | May 25, 1940 |